(12) United States Patent
Marrow

(10) Patent No.: US 8,130,462 B2
(45) Date of Patent: *Mar. 6, 2012

(54) DECOUPLING MAGNETO-RESISTIVE ASYMMETRY AND OFFSET LOOPS

(75) Inventor: Marcus Marrow, Santa Clara, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,417

(22) Filed: Oct. 29, 2010

(65) Prior Publication Data

US 2011/0096433 A1    Apr. 28, 2011

Related U.S. Application Data

(63) Continuation of application No. 11/787,193, filed on Apr. 12, 2007, now Pat. No. 7,848,042.

(60) Provisional application No. 60/901,921, filed on Feb. 15, 2007.

(51) Int. Cl.
    *G11B 5/35* (2006.01)
(52) U.S. Cl. .............. 360/65; 360/25; 360/26; 360/46; 360/67; 360/68
(58) Field of Classification Search .............. None
    See application file for complete search history.

(56) References Cited

U.S. PATENT DOCUMENTS

| | | | | |
|---|---|---|---|---|
| 5,841,602 A * | 11/1998 | Kanegae et al. | ................. | 360/51 |
| 6,052,245 A * | 4/2000 | Sugawara et al. | ................. | 360/46 |
| 6,147,828 A * | 11/2000 | Bloodworth et al. | ........... | 360/65 |
| 6,400,518 B1 * | 6/2002 | Bhaumik et al. | ................. | 360/25 |
| 6,519,106 B1 * | 2/2003 | Goh et al. | ........................ | 360/65 |
| 6,587,292 B1 * | 7/2003 | Ashley et al. | ................... | 360/39 |
| 6,693,863 B2 * | 2/2004 | Shoji et al. | ................. | 369/47.35 |
| 6,940,670 B2 * | 9/2005 | De Jong et al. | ................. | 360/25 |
| 6,980,385 B2 * | 12/2005 | Kato et al. | ....................... | 360/39 |
| 7,012,772 B1 * | 3/2006 | Vis | ................................... | 360/46 |
| 7,092,180 B2 * | 8/2006 | Franck | ........................... | 360/46 |
| 7,298,570 B1 * | 11/2007 | Han | ................................. | 360/65 |
| 7,495,854 B2 * | 2/2009 | Hutchins et al. | ................ | 360/46 |
| 7,511,910 B1 * | 3/2009 | Han | ................................. | 360/65 |
| 7,589,927 B2 * | 9/2009 | Hutchins et al. | ................ | 360/65 |

* cited by examiner

*Primary Examiner* — Dismery Mercedes
(74) *Attorney, Agent, or Firm* — Van Pelt, Yi & James LLP

(57) ABSTRACT

Signal correction is performed by determining an offset error based at least in part on a first portion of a signal within a first amplitude range. The offset error is associated with error due to offset in the signal. An signal error, associated with error due to offset and magneto-resistive asymmetry (MRA) in the signal, is determined based at least in part on a second portion of the signal within a second amplitude range; the second amplitude range does not overlap with the first amplitude range. An MRA error is determined by removing the offset error from the signal error and the MRA error is removed from the signal.

21 Claims, 4 Drawing Sheets

DECOUPLING MAGNETO-RESISTIVE ASYMMETRY AND OFFSET LOOPS

CROSS REFERENCE TO OTHER APPLICATIONS

This application is a continuation of co-pending U.S. patent application Ser. No. 11/787,193, entitled DECOUPLING MAGNETO-RESISTIVE ASYMMETRY AND OFFSET LOOPS filed Apr. 12, 2007 which is incorporated herein by reference for all purposes, which claims priority to U.S. Provisional Application No. 60/901,921, entitled DECOUPLING MAGNETO-RESISTIVE ASYMMETRY AND OFFSET LOOPS filed Feb. 15, 2007 which is incorporated herein by reference for all purposes.

BACKGROUND OF THE INVENTION

Recordings on a magnetic disk can be performed either longitudinally or perpendicularly. In longitudinal recording, information is stored within or parallel to the plane of the magnetic disk. In perpendicular recording, information is stored perpendicular to the plane. Longitudinal recording products have been commercially available for some time; new perpendicular recording products are being developed because of the potential for much higher storage capacity compared to longitudinal recording.

A signal associated with a magnetic disk read channel may have a number of defects, such as offset (e.g., a constant voltage added to the signal), gain (e.g., a constant multiplied by the signal), or magneto-resistive asymmetry (MRA). MRA refers to distortion that results from a magneto-resistive read head operating in a nonlinear region of a magnetic field. Typically, feedback loops are used to handle offset, gain, and MRA. Existing offset loops and MRA loops are coupled, in that an offset error will cause the MRA loop to diverge. Perpendicular recording signals tend to have higher offset. Therefore, improved techniques for handling MRA would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
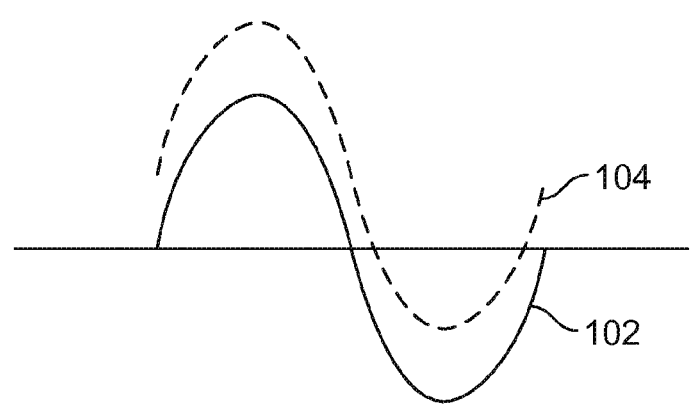
FIG. 1A is a diagram illustrating an example of an ideal signal and a signal with an offset.

FIG. 1A is a diagram illustrating an example of an ideal signal and a signal with an offset. In the example shown, the signals are read signals associated with magnetic disk storage. Signal 102 is an ideal signal. In some embodiments, values are stored magnetically as 0's or 1's on the recording media and are read back. Signal 104 corresponds to ideal signal 102 but includes an offset. As shown in this example, the offset shifts the entire ideal signal up (or down) by some constant (e.g., a DC voltage).

Signal 104 may be modeled using the following equation:

$$y = x + o + n$$

where x is ideal signal 102, o is the offset, n is the noise, and y is signal 104.

Offset is a particular problem in perpendicular recording because perpendicular recording signals tend to have low frequency noise due to effects such as baseline wander. Offset is also a problem when using a tunneling magnetoresistive (TMR) head, which exhibit noise whose power is inversely proportional with frequency, so at lower frequencies (e.g., closer to DC or an offset), the noise power is higher. Low frequency noise may be considered to be a time-varying offset.

Figure 1B:
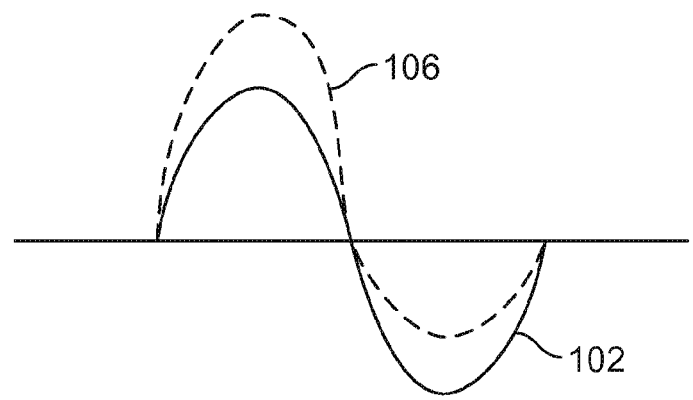
FIG. 1B is a diagram illustrating an example of an ideal signal and a signal with MRA.

FIG. 1B is a diagram illustrating an example of an ideal signal and a signal with MRA. In the example shown, the signals are read signals associated with magnetic disk storage. Signal 102 is an ideal signal. Signal 106 corresponds to ideal signal 102 but includes MRA. As shown in this example, MRA affects the signal y more at higher or larger magnitudes (i.e., |y|) than at lower magnitudes. In this example, signal 106 appears asymmetric (goes more positive than negative). In perpendicular recording, the signal |y| spends little or no time at or near 0, so MRA can cause nonlinearities in the signal in perpendicular recording.

Signal 106 may be modeled using the following equation:

$$y = x + ax^2 + n$$

where x is ideal signal 102, a is the MRA coefficient ($ax^2$ is an estimate of the MRA), n is the noise, and y is signal 106.

Figure 1C:
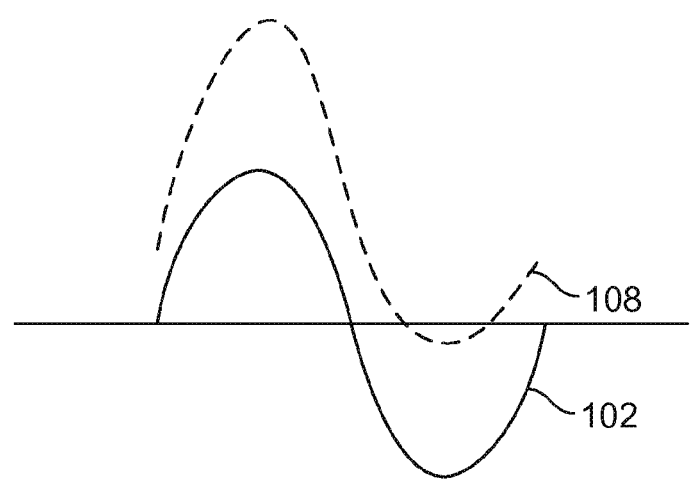
FIG. 1C is a diagram illustrating an example of an ideal signal and a signal with an offset and MRA.

FIG. 1C is a diagram illustrating an example of an ideal signal and a signal with an offset and MRA. In the example shown, the signals are read signals associated with magnetic disk storage. Signal 102 is an ideal signal. Signal 108 corresponds to ideal signal 102 but includes both offset and MRA.

Signal 108 may be modeled using the following equation:

$$y=x+ax^2+o+n$$

where x is ideal signal 102, a is the MRA coefficient ($ax^2$ is an estimate of the MRA), o is the offset, n is the noise, and y is signal 108.

When |y| is small, MRA is small and the offset dominates in the signal y. When |y| is larger, both MRA and offset are present in the signal y.

Feedback loops may be used to compensate for defects in the system. Feedback loops compute an estimated error due to the defect and then change an appropriate circuit to compensate for the estimated error.

An offset (feedback) loop is used to compensate for offset in the system. An MRA (feedback) loop is used to compensate for MRA in the system. An estimated offset error $e_o$ is used to update the offset loop, and an estimated MRA error $e_m$ is used to update the MRA loop. An estimate of the signal error e can be made, but it is not clear how much of the estimated error e is due to offset and how much of it is due to MRA. However, some assumptions can be made based on the fact that the error due to MRA is dominant at higher signal levels (|y|>threshold1) and is smaller at lower signal levels (|y|<threshold2).

The estimated signal error may be modeled using the following equation:

$$e(i)=ax^2+o+n$$

where e is the error component of y.

In the offset loop, the following update equation is used:

$$o=o+K_o e_o$$

where $e_o=0$ when |y(i)|>threshold1 and $e_o=e(i)$ when |y(i)|<threshold2.

where o is the offset compensation signal, $K_o$ is the loop gain, $e_o$ is the estimated offset error, y(i) is the signal at time i and e(i) is an estimate of the signal error at time i. $e_o$ is set to 0 when |y(i)| is above threshold1 because at higher values of |y(i)|, the error is due to both MRA and offset, and it is not clear how much is from offset. To avoid feeding back error due to MRA into the offset loop, $e_o$ is set to 0 at this time. $e_o$ is set to e(i) when |y(i)|<threshold2 because at lower values of |y(i)|, the error is dominated by the effect of offset and there is little or no contribution from MRA. Therefore, the offset loop update equation can be updated at this time. Thus, the offset loop is only updated when the signal y is less than a threshold (to decouple the offset loop from the MRA loop).

In a typical MRA loop, the following update equation is used:

$$mra=mra+K_m e_m$$

where $e_m$ is set to 0 when |y(i)|<threshold and
$e_m=e(i)$ when |y(i)|>threshold.

where mra is the MRA compensation signal, $K_m$ is the loop gain, $e_m$ is the estimated MRA error. y(i) is the signal at time i and e(i) is an estimate of the signal error at time i. $e_m$ is set to 0 when |y(i)| is below threshold because for lower values of |y(i)|, the effect of MRA is minimal and the effect of offset is dominant. Therefore, the MRA equation is not updated at this time. When |y(i)| is above threshold, both offset and MRA contribute to error. However, typical MRA loops are updated at this time. As a result, typical MRA loops are still coupled to the offset loop. If the signal contains an offset, then the error will also contain a DC offset, causing the loop to saturate. In a typical MRA loop, care must be taken to tune the bandwidth of the MRA loop to be sufficiently slower (i.e., lower bandwidth) than the bandwidth of the offset loop so that the loops will settle rather than fight each other. As such, the loop gains $K_o$ and $K_m$, and the threshold(s), which affect the bandwidth, need to be carefully tuned to ensure that the loops settle. Increasing the loop gain increases the speed of the loop.

It would be desirable to better decouple the offset loop from the MRA loop, particularly if there is offset in the signal y and/or when y contains MRA effects, such as in perpendicular recording.

In order to better decouple the offset loop from the MRA loop, in some embodiments, the MRA loop uses the following update equation:

$$mra=mra+K_m e_m$$

where $e_m$ is set to 0 when |y(i)|<threshold2 and
$e_m=e(i)-e(j)$ when |y(i)|>threshold1.

where mra is the MRA compensation signal, $K_m$ is the loop gain, $e_m$ is the estimated MRA error, y(i) is the signal at time i, and e(i) is an estimate of the signal error at time i. In some embodiments, e(j) is an estimate of the offset error. In some embodiments, j is the time at which the offset loop was last updated. In this case, e(j) is the most recently determined estimated offset error prior to the determination of the estimated signal error. In some embodiments, j is any time at which the offset loop was previously updated. In this case, e(j) is any previously determined estimated offset error.

Because the offset loop is only updated when the signal y is less than a threshold (to decouple the offset loop from the MRA loop), e(j) is approximately equal to offset+noise (o+n), so when |y(i)|>threshold1, subtracting e(j) from e(i) removes the offset and noise, leaving an estimate of substantially the MRA error. In other words:

$$e(i)-e(j)=(ax^2+o+n)-(o+n)=ax^2$$

Although the noise terms may not actually be the same, they may be averaged in a filter (as more fully described below) so that they are approximately the same and cancel each other out in the above equation.

In some embodiments, a threshold is not used for the MRA loop. In other words, mra=mra+$K_m$(e(i)-e(j)). This may work because e(i)-e(j) when y is low is small or close to zero so it does not substantially affect the update.

Although two thresholds are shown in the examples herein, in other embodiments one threshold may be used (i.e., threshold1=threshold2). Having one threshold may speed up the loops and/or permit more samples to be used (e.g., instead of discarding information greater than threshold1 but less than threshold2). In other embodiments, any number of thresholds may be used. For example, there may be different thresholds used for the offset loop and for the MRA loop. In some embodiments, the thresholds overlap (i.e., threshold 1>threshold2).

This technique is not as sensitive to the bandwidth of the loop, and therefore the threshold(s) and loop gains do not have to be as carefully tuned or tuned at all.

Figure 1D:
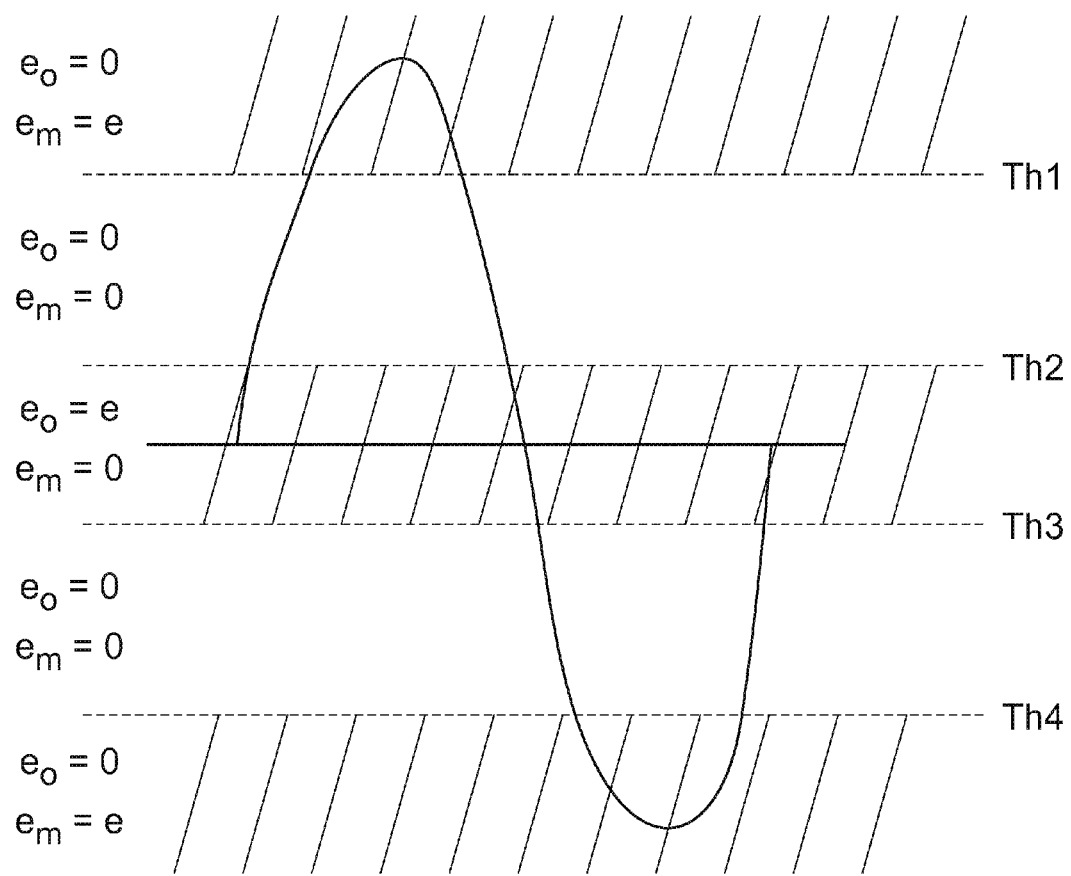
FIG. 1D is a diagram illustrating an example of some thresholds that may be set.

FIG. 1D is a diagram illustrating an example of some thresholds that may be set. In this example, an example of a received signal y is shown along with the regions formed by the threshold values. In some embodiments, thresholds Th1, Th2, |Th3|, and |Th4| are the same, i.e., Th1=Th2=|Th3|=|Th4|. In some embodiments, Th1=|Th4| and Th2=|Th3|. For each region, the values of $e_o$ and $e_m$ are shown, as defined above.

Figure 2:
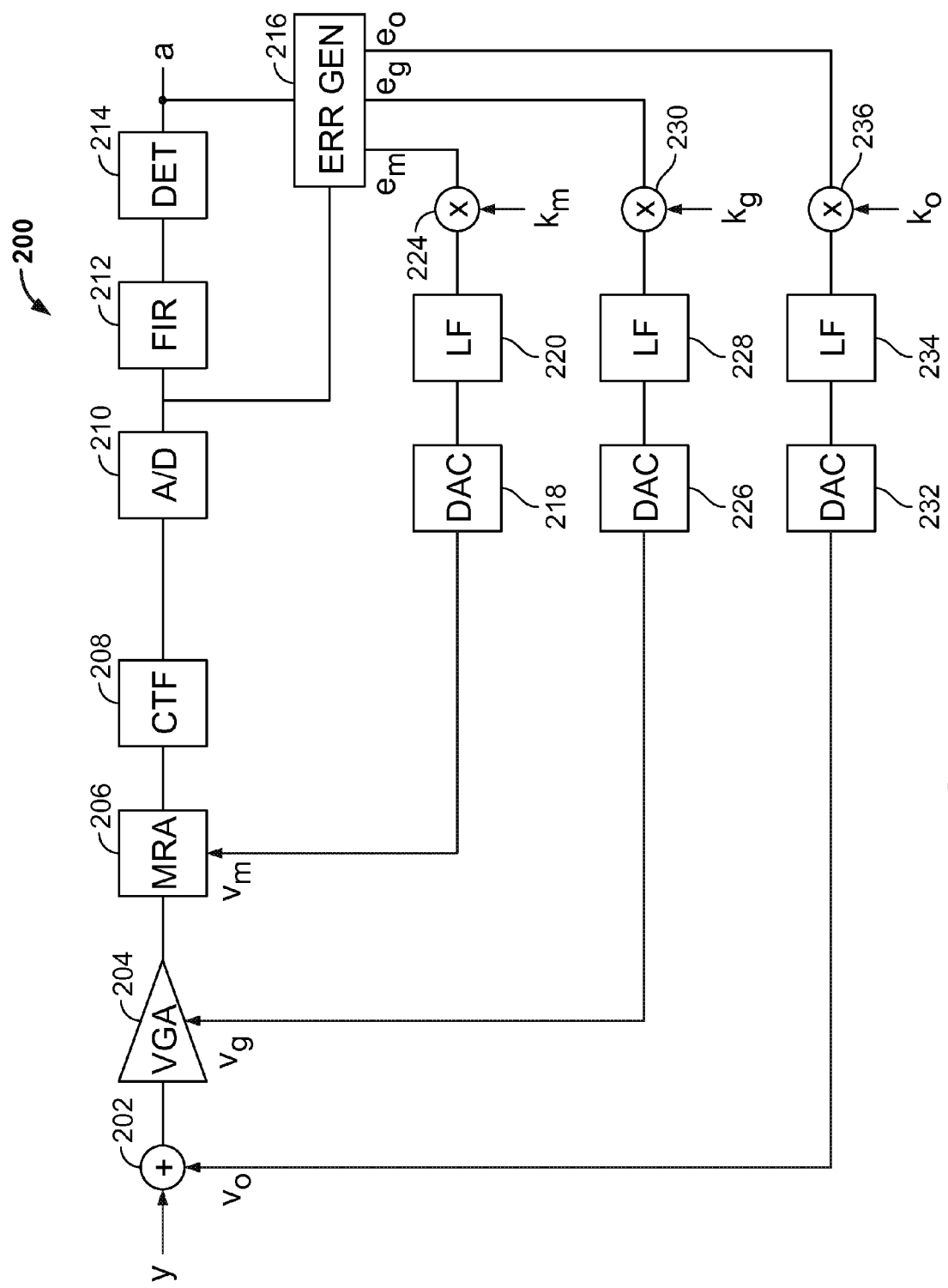
FIG. 2 is a block diagram illustrating an embodiment of a system for removing errors due to MRA, gain, and offset from a signal.

FIG. 2 is a block diagram illustrating an embodiment of a system for removing errors due to MRA, gain, and offset from a signal. In this example, system 200 is shown to include adder 202, variable gain amplifier (VGA) 204, MRA corrector 206, continuous time filter (CTF) 208, A/D converter 210, finite impulse response (FIR) filter 212, detector 214, error generator 216, multipliers (scalers) 224, 230, and 236, loop filters (LF) 220, 228, and 234, and D/A converters (DAC) 218, 226, and 232. LFs 220, 228, and 234 perform averaging and may comprise an integrator. A signal y is received from a read channel, such as a perpendicular recording channel. An offset correction voltage $v_o$ (e.g., corresponding to o above) is added to signal y via adder 202. The output of adder 202 is input to VGA 204 whose gain is adjustable based on VGA input $v_g$, which is a gain correction. The output of VGA 204 is input to MRA corrector 206, which removes MRA from the signal based on MRA corrector input $v_m$ (mra above). The output of MRA corrector 206 is input to CTF 208, whose output is input to A/D 210, whose output is input to FIR 212 and error generator 216. The output of FIR 212 is input to detector 214, which outputs $\ddot{\omega}$, an estimate of y. Both the output of A/D 210 and $\ddot{\omega}$ are input to error generator 216. In various embodiments, detector 214 is a decision feedback equalizer (DFE), Viterbi decoder, or other detector.

Error generator 216 is used to determine and output $e_m$, $e_g$, and $e_o$. Error generator 216 performs the threshold comparisons to output the appropriate values of $e_m$ and $e_o$ as defined above. Three feedback loops are shown: an MRA loop, a gain loop, and an offset loop.

The MRA loop includes multiplier 224, LF 220, DAC 218, and MRA 206. $e_m$ is scaled by multiplier 224 by $K_m$, and input to LF 220, which performs averaging. The output of LF 220 is input to DAC 218, whose output $v_m$ is fed back to MRA corrector 206. $K_m$ is the loop gain; adjusting $K_m$ adjusts the bandwidth of the MRA loop. The threshold(s) used in error generator 216 to determine the value of $e_m$ also affects the bandwidth of the loop. MRA corrector 206 uses $v_m$ to remove MRA error from signal y. In some embodiments, MRA corrector 206 performs the function $Y=X+KX^2$ where X is the input to MRA corrector 206, K is $v_m$, and Y is the output of MRA corrector 206. In some embodiments, the $KX^2$ term substantially cancels out the MRA in X.

The gain loop includes multiplier 230, LF 228, DAC 226, and VGA 204. $e_g$ is scaled by multiplier 230 by $K_g$, and input to LF 228, which performs averaging. The output of LF 228 is input to DAC 226, whose output $v_g$ is fed back to VGA 204. In some embodiments, $e_g$=sign(y)·e(i). VGA 204 uses $v_g$ to remove the gain error from the signal y. $K_g$ is the loop gain; adjusting $K_g$ adjusts the bandwidth of the gain loop.

The offset loop includes multiplier 236, LF 234, DAC 232, and adder 202. $e_o$ is scaled by multiplier 236 by $K_o$, and input to LF 234, which performs averaging. The output of LF 234 is input to DAC 232, whose output $v_o$ is fed back to adder 202. Adder 202 uses $v_o$ to remove offset error from signal y. $K_o$ is the loop gain; adjusting $K_o$ adjusts the bandwidth of the offset loop. The threshold(s) used in error generator 216 to determine the value of $e_o$ also affects the bandwidth of the loop.

Figure 3:
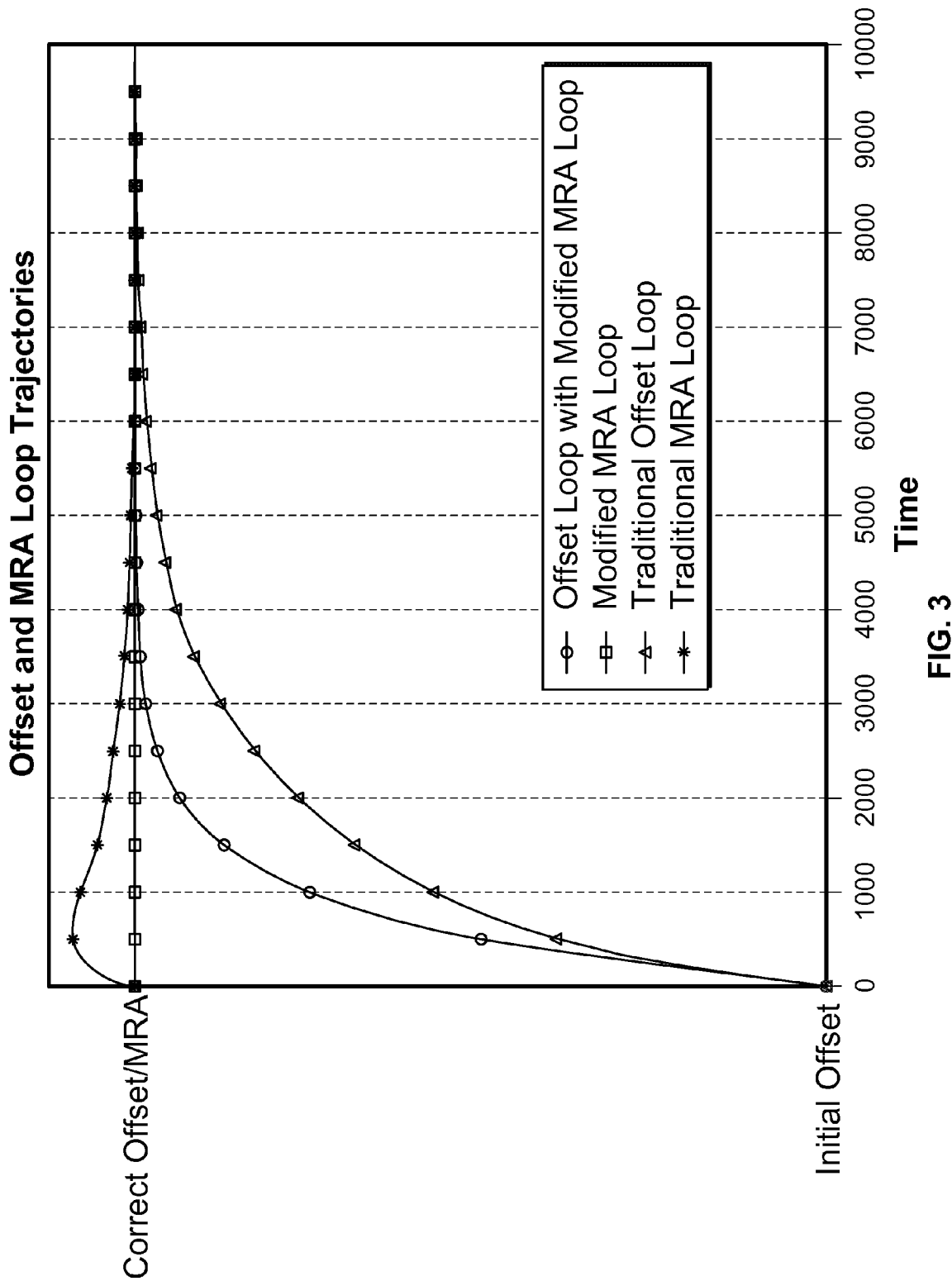
FIG. 3 is a diagram illustrating an example of offset and MRA loop trajectories obtained in some embodiments.

FIG. 3 is a diagram illustrating an example of offset and MRA loop trajectories obtained in some embodiments. In this example, both the offset and the MRA compensation signal are scaled to fit on the same plot. The x-axis is time and the y-axis is the offset o and MRA compensation signal m. The initial offset is located at the origin, and the correct offset and the initial and final MRA compensation signals are located at the same position on the y-axis.

The plots for the traditional offset loop and the traditional MRA loop result when the following MRA update equation is used:

$$mra=mra+K_m e_m$$

where $e_m$ is set to 0 when |y(i)|<threshold2 and $e_m$=e(i) when |y(i)|>threshold1.

The plots for the offset loop with modified MRA loop and modified MRA loop result when the following MRA update equation is used:

$$mra=mra+K_m e_m$$

where $e_m$ is set to 0 when |y(i)|<threshold2 and $e_m$=e(i)−e(j) when |y(i)|>threshold1.

As shown, the trajectory for the offset loop with modified MRA loop takes about 4000 time units (e.g., clock cycles) to reach the correct offset, whereas the trajectory for the traditional offset loop takes about 8000 time units to reach the correct offset.

Similarly, the trajectory for the modified MRA loop takes about does not move from the correct MRA compensation value, whereas the trajectory for the traditional MRA loop jumps up and then settles back to the correct MRA compensation value after about 6000 time units.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for performing signal correction, including:
    using a processor to determine an offset error associated with error due to offset in a signal when a first portion of the signal is within a first amplitude range;
    using the processor to determine asignal error associated with error due to offset and magneto-resistive asymmetry (MRA) in the signal when a second portion of the signal is within a second amplitude range that does not overlap with the first amplitude range;
    determining an MRA error by removing the offset error from the signal error; and
    removing the MRA error from the signal.

2. The method of claim 1, wherein the signal is obtained from magnetic disk storage.

3. The method of claim 1, wherein removing includes using a variable gain amplifier (VGA).

4. The method of claim 1, wherein removing includes using an analog portion of a system.

5. The method of claim 1, wherein using the processor to determine the offset error includes using a feedback loop to generate a new offset error based on a previous offset error.

6. The method of claim 5, wherein the previous offset error input to the feedback loop is set to zero for the portion of the signal outside of the first amplitude range.

7. The method of claim 1, wherein using the processor to determine the signal error includes using a feedback loop to generate a signal offset error based on a previous signal error.

8. The method of claim 7, wherein the previous signal error input to the feedback loop is set to zero for the portion of the signal outside of the second amplitude range.

9. The method of claim 1, wherein determining the MRA error includes setting the MRA error to be zero for the portion of the signal outside of the second amplitude range.

10. A system for performing signal correction, including:
    an error generator configured to:
        determine an offset error associated with error due to offset in a signal when a first portion of the signal is within a first amplitude range;
        determine a signal error associated with error due to offset and magneto-resistive asymmetry (MRA) in the signal when a second portion of the signal is within a second amplitude range that does not overlap with the first amplitude range;

and determine an MRA error by removing the offset error from the signal error; and an MRA corrector configured to remove the MRA error from the signal.

11. The system of claim 10, wherein the error generator is configured to determine the offset error by using a feedback loop to generate a new offset error based on a previous offset error.

12. The system of claim 11, wherein the previous offset error input to the feedback loop is set to zero for the portion of the signal outside of the first amplitude range.

13. The system of claim 10, wherein the error generator is configured to determine the signal error by using a feedback loop to generate a signal offset error based on a previous signal error.

14. The system of claim 13, wherein the previous signal error input to the feedback loop is set to zero for the portion of the signal outside of the second amplitude range.

15. The system of claim 10, wherein the error generator is configured to determine the MRA error by setting the MRA error to be zero for the portion of the signal outside of the second amplitude range.

16. A computer program product for performing signal correction, the computer program product being embodied in a non-transitory computer readable storage medium and comprising computer instructions for:

determining an offset error associated with error due to offset in a signal when a first portion of the signal is within a first amplitude range;

determining a signal error associated with error due to offset and magneto-resistive asymmetry (MRA) in the signal when a second portion of the signal is within a second amplitude range that does not overlap with the first amplitude range;

determining an MRA error by removing the offset error from the signal error; and removing the MRA error from the signal.

17. The computer program product of claim 16, wherein determining the offset error includes using a feedback loop to generate a new offset error based on a previous offset error.

18. The computer program product of claim 17, wherein the previous offset error input to the feedback loop is set to zero for the portion of the signal outside of the first amplitude range.

19. The computer program product of claim 16, wherein determining the signal error includes using a feedback loop to generate a signal offset error based on a previous signal error.

20. The computer program product of claim 19, wherein the previous signal error input to the feedback loop is set to zero for the portion of the signal outside of the second amplitude range.

21. The computer program product of claim 16, wherein determining the MRA error includes setting the MRA error to be zero for the portion of the signal outside of the second amplitude range.

* * * * *